(12) United States Patent
Koo et al.

(10) Patent No.: US 9,795,954 B2
(45) Date of Patent: Oct. 24, 2017

(54) PREPARATION METHOD OF CATALYST COMPRISING A RUTHENIUM-CONTAINING CATALYST LAYER FORMED ON THE BODY SURFACE

(71) Applicant: KOREA INSTITUTE OF ENERGY RESEARCH, Daejeon (KR)

(72) Inventors: Kee-Young Koo, Daejeon (KR); Wang-Lai Yoon, Daejeon (KR); Un-Ho Jung, Daejeon (KR); Young-Jae Hwang, Daejeon (KR); Hyun Ji Eom, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 14/919,132

(22) Filed: Oct. 21, 2015

(65) Prior Publication Data

US 2017/0001187 A1    Jan. 5, 2017

(30) Foreign Application Priority Data

Jun. 30, 2015   (KR) .................. 10-2015-0093080

(51) Int. Cl.
*B01J 23/42*     (2006.01)
*B01J 23/44*     (2006.01)
(Continued)

(52) U.S. Cl.
CPC .......... *B01J 37/035* (2013.01); *B01J 23/462* (2013.01); *B01J 35/002* (2013.01);
(Continued)

(58) Field of Classification Search
CPC . B01J 23/462; B01J 23/42; B01J 23/44; B01J 23/464; B01J 23/466; B01J 23/468;
(Continued)

(56) References Cited

U.S. PATENT DOCUMENTS 9,409,155 B2 *   8/2016  Koo .................. B01J 37/08
2003/0162656 A1 * 8/2003  Wu ................... B01J 23/56
                                                 502/325
(Continued)

FOREIGN PATENT DOCUMENTS

CN    102513102 A    6/2012
EP      2664378 A2   11/2013
(Continued)

OTHER PUBLICATIONS

Sang Hoon Joo et al., "Size Effect of Ruthenium Nanoparticles in Catalytic Carbon Monoxide Oxidation," American Chemical Society, Nano Letters, 2010, pp. 2709-2713, vol. 10.

*Primary Examiner* — Patricia L Hailey
(74) *Attorney, Agent, or Firm* — McNees Wallace & Nurick LLC

(57) ABSTRACT

The present invention relates to a method for preparing a catalyst comprising a ruthenium-containing catalyst layer highly dispersed with a uniform thickness on a surface of a substrate having a structure, which comprises first aging a mixed solution of a ruthenium precursor-containing solution and a precipitating agent to form a ruthenium-containing precipitate seeds, secondarily aging the first aged mixed solution to grow the seeds thereby forming ruthenium-containing precipitate particles, and then contacting the particles with a substrate to deposit the particles on the surface of the substrate. Since the catalyst has a structure in which the round shaped ruthenium-containing precipitate particles are piled to form the ruthenium-containing catalyst layer, it has a large specific surface area. Thus, the catalyst may exhibit excellent catalytic performance in various reactions for producing hydrogen using a ruthenium catalyst.

12 Claims, 6 Drawing Sheets

(51) Int. Cl.

| | |
|---|---|
| *B01J 37/03* | (2006.01) |
| *B01J 23/46* | (2006.01) |
| *B01J 37/08* | (2006.01) |
| *C01B 3/16* | (2006.01) |
| *C01B 3/58* | (2006.01) |
| *B01J 37/10* | (2006.01) |
| *B01J 37/34* | (2006.01) |
| *B01J 35/00* | (2006.01) |
| *C01B 3/40* | (2006.01) |
| *B82Y 30/00* | (2011.01) |

(52) U.S. Cl.
CPC .......... *B01J 35/0013* (2013.01); *B01J 37/031* (2013.01); *B01J 37/08* (2013.01); *B01J 37/10* (2013.01); *B01J 37/342* (2013.01); *C01B 3/16* (2013.01); *C01B 3/40* (2013.01); *C01B 3/583* (2013.01); *B82Y 30/00* (2013.01); *C01B 2203/0233* (2013.01); *C01B 2203/0283* (2013.01); *C01B 2203/044* (2013.01); *C01B 2203/047* (2013.01); *C01B 2203/1064* (2013.01); *C01B 2203/1082* (2013.01); *Y02P 20/52* (2015.11)

(58) Field of Classification Search
CPC ...... B01J 35/023; B01J 37/00; B01J 37/0225; B01J 37/035; B01J 37/08; C01B 3/16; C01B 2203/044; C01B 2203/0283; C01B 2203/1064; C01B 2203/0233; C01B 2203/1082; C01B 2203/047
USPC ........................................................ 502/185
See application file for complete search history.

(56) References Cited

U.S. PATENT DOCUMENTS

| | | | |
|---|---|---|---|
| 2008/0038161 A1* | 2/2008 | Marti ................... | B01D 53/945 422/177 |
| 2010/0068130 A1* | 3/2010 | Wilhelm ................ | B01J 21/04 423/648.1 |
| 2010/0125036 A1* | 5/2010 | Sharma .................. | B01J 23/40 502/330 |
| 2010/0261600 A1* | 10/2010 | Yoon ..................... | B01J 23/755 502/5 |

FOREIGN PATENT DOCUMENTS

| | | | | |
|---|---|---|---|---|
| JP | 200688058 A | | 4/2006 | |
| JP | 2014510620 A | | 5/2014 | |
| KR | 10-2013-0014364 | * | 2/2013 | ............. B01J 37/08 |
| KR | 20130014364 A | | 2/2013 | |
| WO | 2013/019013 | * | 2/2013 | ............ B01J 23/755 |

* cited by examiner

PREPARATION METHOD OF CATALYST COMPRISING A RUTHENIUM-CONTAINING CATALYST LAYER FORMED ON THE BODY SURFACE

TECHNICAL FIELD

The present invention relates to a method of preparing a catalyst comprising a ruthenium-containing catalyst layer formed on a surface of a substrate having a structure and a use of the catalyst prepared thereby.

BACKGROUND

In the conventional preparation of a metal substrate comprising a catalyst coating layer, the representative catalyst coating methods were an impregnation method, wherein the metal substrate is impregnated in a catalyst precursor solution to support the catalyst, and a washing coating method, wherein the metal surface is coated with a catalyst using a slurry solution which is a mixture of a powder catalyst, whose catalyst is supported by a carrier in advance, and an alumina sol.

In achieving a certain amount of catalyst loading, the impregnation method has the problems of increase of number of impregnation and difficult control of dispersion of the active metal particles due to the low catalyst loading amount. Also, the washing coating has the problem of the weak binding strength between the catalyst coating layer and the metal substrate since controlling coating layer thickness and uniform coating are difficult. Furthermore, it needs a large amount of catalyst due to the much loss of coating solution.

Thus, the present inventors had developed a method for preparing a metal structured catalyst, which comprises contacting a mixed solution including a precursor of the metal catalyst and a precipitating agent with the metal substrate to form a metal precipitate on the metal substrate and performing heat treatment, whereby metal nanoparticles were supported more uniformly and with high dispersion and the binding strength between the catalyst layer and the metal substrate surface was enhanced (Korean Patent No. 10-1403698).

However, when a precursor of a ruthenium catalyst was applied to the above method to form a ruthenium catalyst layer, the coating layer of the ruthenium catalyst was not formed well on the metal substrate surface. Thus, according to the above method, it was not easy to form a ruthenium catalyst layer exhibiting appropriate catalytic activity.

SUMMARY OF THE INVENTION

An object of the present invention is to provide a method of preparing a catalyst comprising a ruthenium-containing catalyst layer on a surface of a substrate having a structure wherein the ruthenium-containing layer is highly dispersed and formed uniformly to exhibit excellent catalytic activity, and a method of using the catalyst prepared thereby.

DISCLOSURE OF THE INVENTION

The first embodiment of the present invention provides a method of preparing a catalyst comprising a ruthenium-containing catalyst layer formed on a surface of a substrate having a structure, which comprises adding a precipitating agent to a ruthenium (Ru) precursor-containing solution to obtain a mixed solution (step 1); first aging the mixed solution of the step 1 at 10° C. to 40° C. to form ruthenium-containing precipitate seeds (step 2); secondarily aging the first aged mixed solution at 80° C. to 100° C. to grow the ruthenium-containing precipitate seeds, thereby forming ruthenium-containing precipitate particles (step 3); contacting the secondarily aged mixed solution with the substrate to coat the surface of the substrate with the ruthenium-containing precipitate particles, thereby inducing the formation of a ruthenium-containing layer (step 4); and conducting a heat treatment of the ruthenium-containing layer (step 5).

The second embodiment of the present invention provides a method of forming a ruthenium-containing layer on a surface of a substrate having a structure, which comprises adding a precipitating agent to a ruthenium (Ru) precursor-containing solution to obtain a mixed solution (step 1); first aging the mixed solution of the step 1 at 10° C. to 40° C. to form ruthenium-containing precipitate seeds (step 2); secondarily aging the first aged mixed solution at 80° C. to 100° C. to grow the ruthenium-containing precipitate seeds, thereby forming ruthenium-containing precipitate particles (step 3); and contacting the secondarily aged mixed solution with the substrate to coat the surface of the substrate with the ruthenium-containing precipitate particles, thereby inducing the formation of a ruthenium-containing layer (step 4).

The third embodiment of the present invention provides a catalyst prepared according to the method of the first embodiment, in which a ruthenium-containing catalyst layer is formed on a surface of a substrate having a structure, a pile of the round shaped ruthenium-containing precipitate particles.

The fourth embodiment of the present invention provides a method for producing hydrogen, which comprises producing hydrogen using the catalyst according to the third embodiment.

The fifth embodiment of the present invention provides a method for preparing synthetic gas using a steam reforming reaction of natural gas, which comprises i) applying the catalyst according to the third embodiment to a steam reforming reactor of natural gas; ii) reducing the catalyst to activate it; and iii) performing the steam reforming reaction of natural gas by the activated catalyst.

The sixth embodiment of the present invention provides a method for removing carbon monoxide (CO) using a preferential oxidation of carbon monoxide, which comprises i) applying the catalyst according to the third embodiment to a preferential oxidation reactor of carbon monoxide; ii) reducing the catalyst to activate it; and iii) performing the preferential oxidation of carbon monoxide by the activated catalyst.

The present invention will be explained more in detail below.

In the formation of the ruthenium-containing layer on a surface of a substrate having a structure, as depicted in FIG. 1, the present inventors have found that the ruthenium-containing layer is highly dispersed and formed uniformly on the surface of the substrate to exhibit excellent catalytic activity by first aging the mixed solution of the precipitating agent and the ruthenium (Ru) precursor-containing solution at a low temperature of up to 40° C. to form the ruthenium-containing precipitate seeds, secondarily aging the first aged mixed solution at a high temperature of 80° C. or more to grow the ruthenium-containing precipitate seeds into the ruthenium-containing precipitate particles, contacting it and the substrate to coat the surface of the substrate with the ruthenium-containing precipitate particles, thereby inducing the formation of the ruthenium-containing layer. The present invention is based on this discovery.

As stated above, the method of preparing a catalyst comprising a ruthenium-containing catalyst layer formed on a surface of a substrate having a structure, which comprises:

adding a precipitating agent to a ruthenium (Ru) precursor-containing solution to obtain a mixed solution (step 1);

first aging the mixed solution of the step 1 at 10° C. to 40° C. to form ruthenium-containing precipitate seeds (step 2);

secondarily aging the first aged mixed solution at 80° C. to 100° C. to grow the ruthenium-containing precipitate seeds, thereby forming ruthenium-containing precipitate particles (step 3);

contacting the secondarily aged mixed solution with the substrate to coat the surface of the substrate with the ruthenium-containing precipitate particles, thereby inducing the formation of a ruthenium-containing layer (step 4); and conducting a heat treatment of the ruthenium-containing layer (step 5).

As stated above, also, the method of forming a ruthenium-containing layer on a surface of a substrate having a structure, which comprises:

adding a precipitating agent to a ruthenium (Ru) precursor-containing solution to obtain a mixed solution (step 1);

first aging the mixed solution of the step 1 at 10° C. to 40° C. to form ruthenium-containing precipitate seeds (step 2);

secondarily aging the first aged mixed solution at 80° C. to 100° C. to grow the ruthenium-containing precipitate seeds, thereby forming ruthenium-containing precipitate particles (step 3); and contacting the secondarily aged mixed solution with the substrate to coat the surface of the substrate with the ruthenium-containing precipitate particles, thereby inducing the formation of a ruthenium-containing layer (step 4).

As an embodiment of the present invention, the above steps, i.e., the step 1 to the step 5, the step 1 to the step 4, and in particular the step 2 and the step 3, may be performed in order. When the step 2 and the step 3 are performed in order, the ruthenium-containing precipitate particles may be formed well and deposited on the surface of the substrate to give a uniform ruthenium-containing layer. In addition, as another embodiment, the step 3 and the step 4 may be simultaneously performed. That is, in the state of contacting the structure with the ruthenium-containing precipitate seeds, the seeds may be grown to result in the growth of ruthenium-containing precipitate seeds and the coating by ruthenium-containing precipitate particles at the same time. In other words, the substrate is introduced to the first aged mixed solution and then the secondary aging is performed in the third step, whereby the ruthenium-containing precipitate particles are formed and simultaneously coated on the surface of the substrate.

The step 1 is a step of obtaining a mixed solution by adding a precipitating agent to a ruthenium (Ru) precursor-containing solution for the formation of ruthenium-containing precipitate particles.

In the present invention, the ruthenium (Ru) precursor-containing solution may further comprise a precursor of platinum (Pt), palladium (Pd), rhodium (Rh), iridium (Ir), osmium (Os) or a mixed metal thereof, whereby the ruthenium-containing layer thus formed may further comprise platinum (Pt), palladium (Pd), rhodium (Rh), iridium (Ir), osmium (Os) or a mixed metal thereof in addition to ruthenium.

The metal precursor of the present invention is preferably one or more selected from the group consisting of a metal nitrate, a metal halide, a metal acetate, a metal sulfate, a metal acetoacetate, a metal fluoroacetoacetate, a metal perchlorate, a metal sulfamate, a metal stearate, a metal phosphate, a metal carbonate, a metal oxalate and a metal complex (e.g., metal EDTA), but is not limited thereto.

The precipitating agent of the present invention acts as a reactant used in the precipitation reaction for forming an insoluble solid (precipitate) by the ion exchange with a soluble ion substance derived from the metal precursor. Specifically, it may be ammonia, KOH, NaOH, urea, $Na_2CO_3$, $K_2CO_3$ or a mixture thereof, but is not limited thereto.

In the present invention, mixing of the precursor solution with the precipitating agent may be achieved by feeding the precipitating agent into the precursor solution at a constant speed or by simultaneously mixing the precursor solution and the precipitating agent. The precursor solution may be an aqueous solution obtained by mixing the precursor and water.

In the present invention, the mixed solution in the step 1 may have a pH of 6 to 11, preferably 6 to 8.5. Although the ruthenium-containing layer may be formed even at the pH range of 6 to 11 of the mixed solution, if the pH exceeds 8.5, the formation speed of the ruthenium-containing particles is low and thus the deposition on the surface of the substrate may not be performed well. In the present invention, particularly when the pH of the mixed solution in the step 1 is adjusted to a pH of 6.5 to 8.5, the ruthenium-containing particles are developed well in a round shape. In such a case, the particle size is uniform, and when the ruthenium-containing particles are coated on the surface of the substrate, the ruthenium-containing particles may have a larger specific surface area due to the pores between the round shaped particles, and the coating layer formed by the ruthenium-containing particles may have a uniform thickness. Accordingly, when the ruthenium-containing particles are used as a catalyst, it shows excellent catalytic activity.

The step 2 is a step of forming a ruthenium-containing precipitate seeds to be grown into particles by first aging the mixed solution obtained in the step 1 at 10° C. to 40° C.

As stated above, the first aging may be performed at the temperature range of 10° C. to 40° C., preferably at room temperature, specifically at 20° C. to 30° C. If the first aging temperature is less than 10° C. or exceeds 40° C., the seeds may not be formed well, making the growth of particles difficult even after the secondary aging. The first aging may be performed for 3 h to 48 h. The seeds are not formed well if the aging time is too short, and the seeds may not be easily grown into particles if the aging time is too long. Furthermore, the first aging may be performed with stirring in order to facilitate the formation of the seeds.

The step 3 is a step of forming ruthenium-containing precipitate particles by secondarily aging the first aged mixed solution at an increased temperature of 80° C. to 100° C. to grow the ruthenium-containing precipitate seeds.

As stated above, the secondary aging may be performed at the temperature range of 80° C. to 100° C., more preferably at 90° C. to 100° C. The chemical reaction velocity between the precipitating agent and the metal precursor solution may be slow to retard the growth of the primary nanoparticles if the second aging temperature is less than 80° C., and the control of the primary particle size may be difficult due to the excessively fast reaction if the temperature exceeds 100° C. The secondary aging may be performed for 36 h to 100 h. The growth of particles may not be achieved well, and so the particles having a desired size may not be obtained if the aging time is too short, and the problem of particle size increase may occur if the aging time is too long.

The step 4 is a step of coating the ruthenium-containing layer on the surface of the substrate by contact of the secondarily aged mixed solution with the substrate to deposit the ruthenium-containing precipitate particles in the secondarily aged mixed solution on the surface of the substrate.

Any substrate (a body) which has a surface on which the ruthenium-containing precipitate particles can be deposited may be used in the present invention. Preferably, the substrate may be a metal substrate or a ceramic substrate. Specifically, the substrate may consist of a FeCr alloy, SiC, Al, an Al alloy, Ti, a Ti alloy or stainless steel. Also, the substrate may have a variety of structure such as monolith, foam, felt, mat, mesh, foil, pin, etc. The pin structure may include ruffled, perforated, herringbone, etc.

In a case where a metal substrate is used as the above substrate, the metal substrate may be prepared by a method comprising a step of electrochemical treatment of the metal substrate surface to form a metal oxide layer on the surface by controlling the applied voltage and the concentration of electrolyte in the electrolyte; and a step of heat treatment under an oxidizing atmosphere to crystallize the amorphous metal oxide layer formed on the metal substrate or to form a metal oxide layer only of a certain metal component of the alloy. The method may further include a step of washing the surface of the metal substrate prior to the surface treatment. The step of electrochemical treatment of the surface refers to a step of applying a voltage of 2 V to 30 V between two electrodes, a cathode and an anode, for 5 min to 60 min at room temperature under the conditions that the cathode is one selected from copper, iron or platinum coil, the anode is the metal substrate, and the electrolyte is one selected from hydrofluoric acid, phosphoric acid, sodium fluoride and sodium nitrate or combinations thereof having the concentration of 0.5% to 3% by weight. It is preferable for the above heat treatment step to be performed under the oxidizing atmosphere at 700° C. to 1100° C. The metal substrate may also be prepared by the method including an additional step of coating an additional carrier on the metal oxide layer after the heat treatment step. The carrier may be alumina, boehmite, titania, silica or a mixture of ceria-zirconia, but is not limited thereto.

When the metal substrate is used, the metal substrate itself shows excellent heat transfer and so may be used for a catalyst requiring fast heat transfer.

The step 5 is a step of heat-treating the ruthenium-containing layer formed in the step 4.

The heat treatment may be performed preferably at the temperature range of 200° C. to 900° C., and more preferably at 200° C. to 800° C. The crystal growth of nanoparticles does not occur when the heat treatment temperature is less than 200° C., and there is a problem that the particle size increases due to the aggregation of the nanoparticles when the temperature exceeds 900° C. The heat treatment may be performed under an oxidizing or reducing atmosphere. The oxidizing atmosphere may be obtained under an oxygen-containing gas, for example, air (atmosphere), and the reducing atmosphere may be obtained under hydrogen.

The catalyst comprising the ruthenium-containing catalyst layer formed on the surface of the substrate, which is prepared by the method according to the present invention, may have a structure wherein the round shaped ruthenium-containing precipitate particles are piled on the substrate to form the ruthenium-containing catalyst layer. The catalyst obtained by the present method may comprise a ruthenium-containing catalyst layer having a more uniform thickness, which is because the round shaped ruthenium-containing precipitate particles obtained through the first and the secondary aging to have a uniform size are piled on the surface to form the ruthenium-containing catalyst layer. In addition, the pH condition, temperature and time of the first and the secondary aging for forming the ruthenium-containing precipitate particles may be adjusted to control the size of ruthenium-containing precipitate particles and to ultimately control the thickness of ruthenium-containing catalyst layer coated on the surface of the substrate.

The ruthenium-containing precipitate particles may have the average particle diameter of 0.02 μm to 0.5 μm, and the ruthenium-containing catalyst layer may have the average thickness of 0.1 μm to 25 μm.

Furthermore, through the process of first forming the ruthenium-containing precipitate particles and then depositing, the ruthenium-containing catalyst layer, which is highly dispersed by only a small amount of ruthenium, can be advantageously obtained.

As stated above, the present invention provides a catalyst comprising the ruthenium-containing catalyst layer which has a uniform thickness and is highly dispersed. This catalyst is prepared according to the method wherein the ruthenium-containing precipitate particles are formed first and then deposited on the surface of the substrate. This catalyst has a large specific surface area and can thus exhibit excellent catalytic activity in various reactions for producing hydrogen using a ruthenium catalyst.

Therefore, in comparison to the conventional pellet catalyst which is to be applied into the packed bed column reactor, the catalyst according to the present invention, coated with a small amount of ruthenium, may be applied to a reactor for producing hydrogen and synthetic gas, so the reactor size can be reduced and the amount of the expensive precious metal catalyst used can be dramatically reduced, one can expect a cost saving effect for the production system of hydrogen and synthetic gas.

The above production of hydrogen may be achieved by a steam reforming reaction, water-gas shift (WGS) or preferential oxidation (PROX) reaction, etc.

As stated above, as an embodiment for producing hydrogen, the present invention provides a method for preparing synthetic gas using a steam reforming reaction of natural gas, which comprises:

i) applying the catalyst of the present invention to a steam reforming reactor of natural gas;

ii) reducing the catalyst to activate it; and iii) performing the steam reforming reaction of natural gas by the activated catalyst.

In the present invention, step iii) above may be performed at the reaction temperature of 500° C. to 800° C., the reaction pressure of 1.2 bar to 3 bar, and the gas hourly space velocity of 3,000 $h^{-1}$ to 60,000 $h^{-1}$.

In addition, as another embodiment for producing hydrogen, the present invention provides a method for removing carbon monoxide (CO) using a preferential oxidation of carbon monoxide, which comprises:

i) applying the catalyst of the present invention to a preferential oxidation reactor of carbon monoxide;

ii) reducing the catalyst to activate it; and iii) performing the preferential oxidation of carbon monoxide by the activated catalyst.

In the present invention, step iii) above may be performed at the reaction temperature of 80° C. to 200° C., the reaction pressure of 1.2 bar to 3 bar, the oxygen excess (λ) of 1 to 4, and the gas hourly space velocity (GHSV) of 5,000 $h^{-1}$ to 10,000 $h^{-1}$.

Advantageous Effects

The present invention can provide a catalyst prepared by a method comprising first aging the mixed solution of the precipitating agent and the ruthenium precursor-containing solution to form the ruthenium-containing precipitate seeds, secondarily aging to grow the seeds so as to form the ruthenium-containing precipitate particles, and contacting them and the substrate to deposit the particles on the surface of the substrate, thereby forming the ruthenium-containing catalyst layer that is highly dispersed with a uniform thickness. Since the catalyst has a structure wherein the round shaped ruthenium-containing precipitate particles are piled to form the ruthenium-containing catalyst layer, it has a large specific surface area. Thus, the catalyst may show excellent catalytic performance in various reactions for producing hydrogen using a ruthenium catalyst. Furthermore, in comparison to the conventional pellet catalyst which is to be applied into the packed bed column reactor, the catalyst according to the present invention, coated with a small amount of ruthenium, makes reduced reactor size possible and dramatically reduces the amount of the expensive precious metal catalyst used, resulting in a cost saving effect for the production system of hydrogen and synthetic gas.

DETAILED DESCRIPTION OF EXEMPLARY EMBODIMENTS

Hereinafter, the present invention will be explained in detail through the following examples. However, these examples are intended to illustrate the present invention, but not to limit the scope thereof.

Example 1: Analysis of Ruthenium Coating Layer Depending on pH of Precipitation Reaction Solution of Ruthenium Precursor First, in the same manner as Korean Patent No. 1019234, a surface of an FeCr alloy foil, a metal substrate of a ferrochrome alloy material, was electrochemically treated at 5 V for 30 min and then heat-treated at 900° C. for 6 h to prepare the metal substrate for ruthenium coating wherein an alumina layer is uniformly formed as a carrier on the surface thereof.

Ruthenium nitrosyl nitrate as a ruthenium precursor was mixed with distilled water to give a solution in the concentration of 230 mM. Different amounts of ammonia solution as a precipitating agent were added to the above solution to prepare Samples 1 to 4 having a pH of 6, 7, 8 and 11, respectively. After each of the solutions thus obtained was first aged by stirring at room temperature (25° C.) for 24 h, the FeCr alloy foil, a substrate as prepared above, was immersed in the above aged solution and secondarily aged at 100° C. for 48 h.

Figure 1:
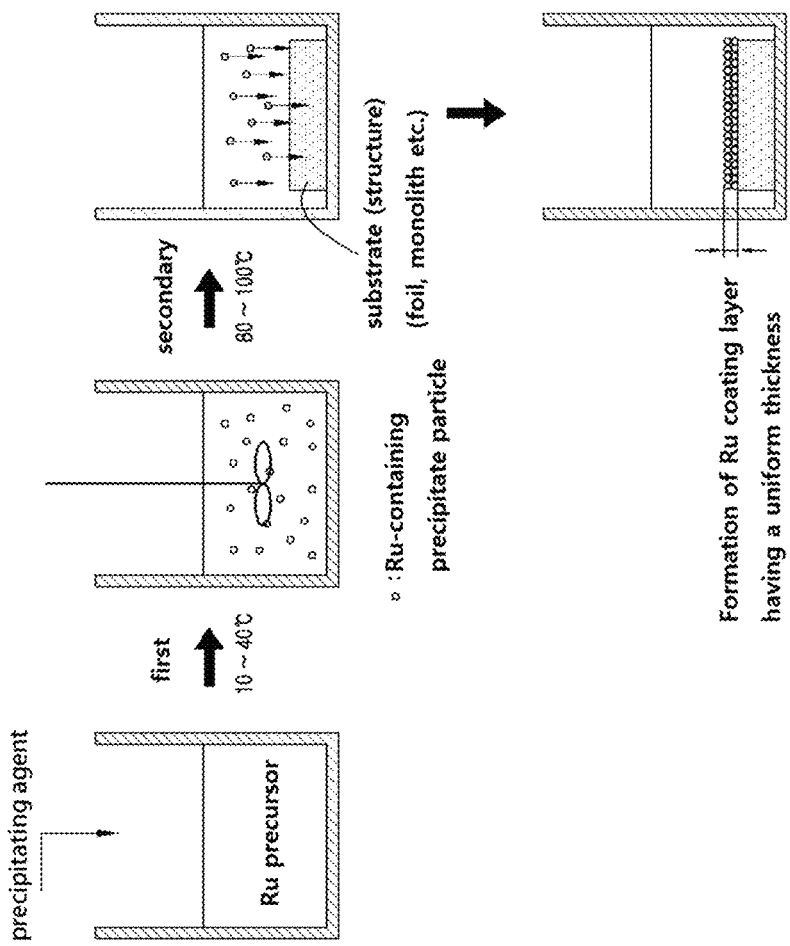
FIG. 1 is a diagram illustrating the process of forming the ruthenium-containing layer on the surface of the substrate according to the present invention.
Figure 2:
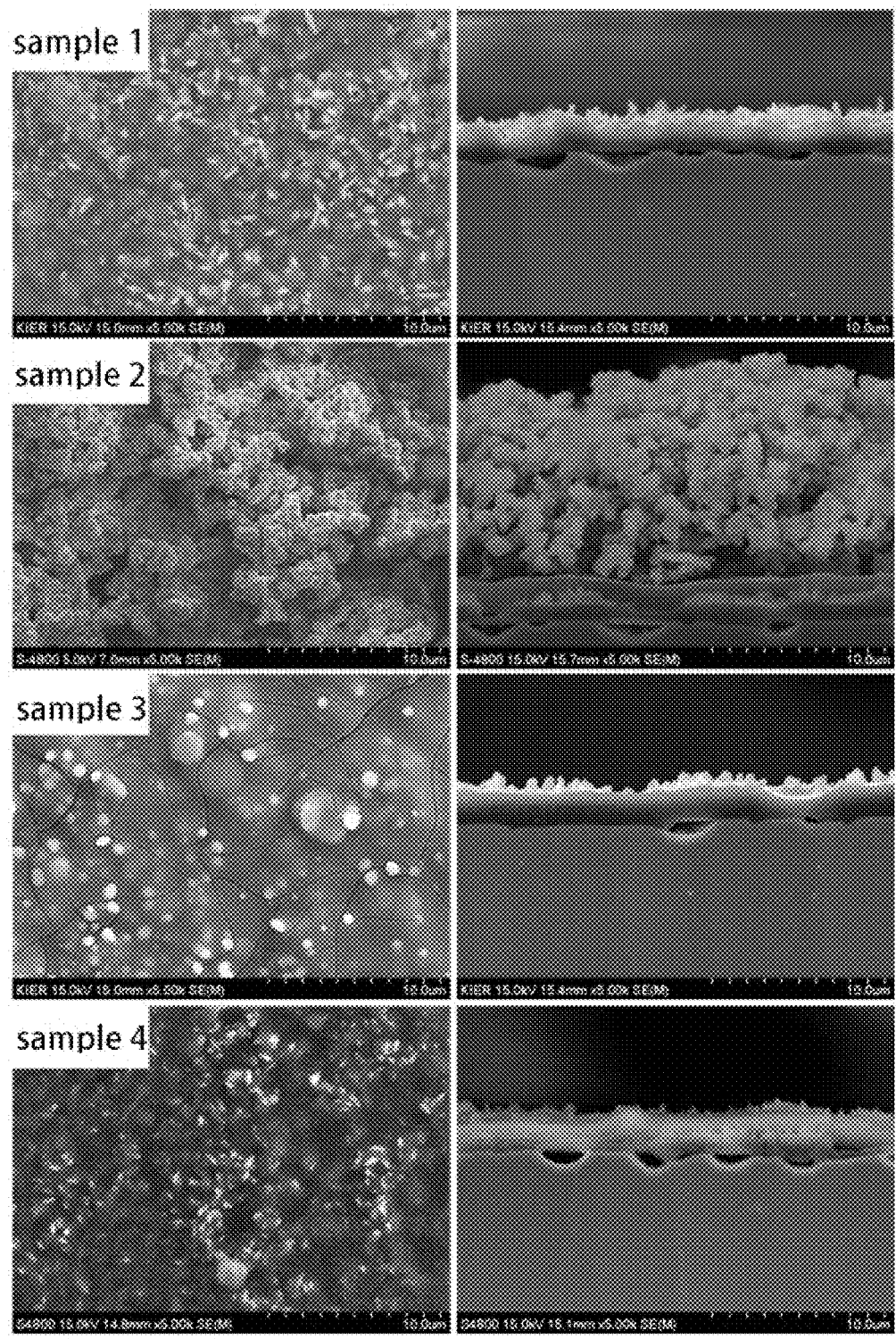
FIG. 2 shows the results of analyzing the surface and cross section (SEM, ion-milling analysis) of FeCr alloys prepared by varying pH of the precursor solution.

Surfaces of the FeCr alloy foils prepared by a different pH and by a different amount of precipitating agent added to the ruthenium precursor solution were analyzed by a scanning electron microscope (SEM). The results are shown in FIG. 2. From FIG. 2, it can be confirmed that the deposition morphology of particles on the surface of the FeCr alloy foil was varied depending on the pH change of the reaction solution. In particular, the round shaped particles, i.e., the spherical particles, were formed much more in Sample 2.

Furthermore, from the cross section ion milling analysis, the thickness of the catalyst layer coated on the metal foil surface was measured. Sample 2 showed the thickest coating layer, whereas the other samples showed a relatively thin coating layer of about 1 μm. In the case of the reaction solutions having a pH of lower than 7 (Sample 1 of pH 6) or a pH of higher than 8.5 (Sample 4 of pH 11), coating on the surface of the substrate was not performed well due to the slow formation of Ru particles. However, if the time of forming the Ru particles and coating, i.e., the time of secondary aging, was kept long, the Ru coating was made on the FeCr alloy foil surface. In other words, in the case of Samples 1 and 4, the surface of the substrate was not coated well with Ru during the initial period of the secondary aging, but coated with the lapse of aging time.

Thus, it was found that particle size and shape may be controlled by pH adjustment of the precipitation reaction solution, and accordingly the thickness of the coated Ru layer may be controlled.

Also, composition of the FeCr alloy surface coated with Ru was analyzed by EDS (energy-dispersive X-ray spectroscopy). The results are summarized in Table 1 below.

TABLE 1

| | Sample | | | |
|---|---|---|---|---|
| | 1 | 2 | 3 | 4 |
| pH of Reaction Solution | 6 | 7 | 8 | 11 |
| Al (At. %) | 37.8 | 6.5 | 32.3 | 40.0 |
| Cr (At. %) | 0.2 | — | 0.3 | 0.3 |
| Fe (At. %) | 0.6 | 0.8 | 0.6 | 0.7 |
| Ru (At. %) | 1.1 | 16.7 | 5.9 | 0.8 |
| O (At. %) | 60.3 | 76.0 | 60.9 | 58.2 |

From the above Table 1, it can be seen that the Ru content is highest in Sample 2.

Thus, it can be confirmed that the content of Ru coated can be controlled by pH adjustment of the precipitation reaction solution.

According to the results of FIG. 2 and Table 1, it can also be confirmed that a pH of 7 to 8 of the solution obtained by adding the precipitating agent to the ruthenium precursor solution is desirable in aspects of the size and shape of Ru particles thus formed as well as the thickness of the Ru coating layer and the Ru content.

Comparative Example 1: Analysis of Ruthenium Coating Layer Depending on Impregnation Method and Single Step Aging Method The same substrate as Example 1 was used.

Ruthenium nitrosyl nitrate as the ruthenium precursor was mixed with distilled water to prepare a ruthenium precursor solution of the desired concentration.

Ru was supported according to the impregnation method in Sample 5. Specifically, Sample 5 was prepared by immersing the substrate as above into 300 mM of the ruthenium precursor solution and then drying at 90° C.

Samples 6 to 8 were prepared with different concentrations of Ru precursor solutions according to the process of adding an ammonia solution as a precipitating agent to each of the Ru precursor solutions to adjust the pH to 11, immersing the substrate into this solution, and aging it at 90° C. for 64 h to make the Ru coating.

The composition of the sample surface prepared above was analyzed by EDS. The results are summarized in Table 2 below.

TABLE 2

| | Sample | | | |
|---|---|---|---|---|
| | 5 | 6 | 7 | 8 |
| Concentration of precursor solution | 300 mM | 300 mM | 500 mM | 1000 mM |
| Al (At. %) | 33.01 | 37.32 | 31.97 | 29.20 |
| Cr (At. %) | 0.68 | 0.22 | 0.43 | 0.83 |
| Fe (At. %) | 1.47 | 0.55 | 0.77 | 1.74 |
| Ru (At. %) | 1.78 | 0.26 | 0.35 | 0.53 |
| O (At. %) | 63.05 | 61.65 | 66.47 | 67.70 |

Comparing Tables 1 and 2, it can be seen that Samples 2 and 3 prepared according to the present invention have a greater content of Ru coating than Sample 5 prepared by the impregnation method. In Samples 6 to 8, which are obtained by directly immersing the FeCr alloy foil substrate without the first aging, and by coating with forming the Ru precipitate in one aging step, the amount of Ru coated increases as the concentration of the precursor solution increases. However, Sample 8, prepared by using 1000 mM of the Ru precursor solution (4-fold higher concentration of the precursor solution), showed a Ru coating amount of only 66% under the same condition of pH 11, in comparison to Sample 4, prepared by the two aging steps according to the present invention using 230 mM of the Ru precursor solution. Thus, the method of performing the first aging prior to the immersion of FeCr alloy foil substrate and then the secondary aging with the immersion of the substrate as in the present invention has been confirmed to make the highly dispersed immersion of Ru metal on the surface of the substrate easier than the method of a single aging step.

Furthermore, the FeCr alloy foil surfaces of Samples 5 to 8 coated with Ru were analyzed by SEM. The results are shown in FIG. 3.

Figure 3:
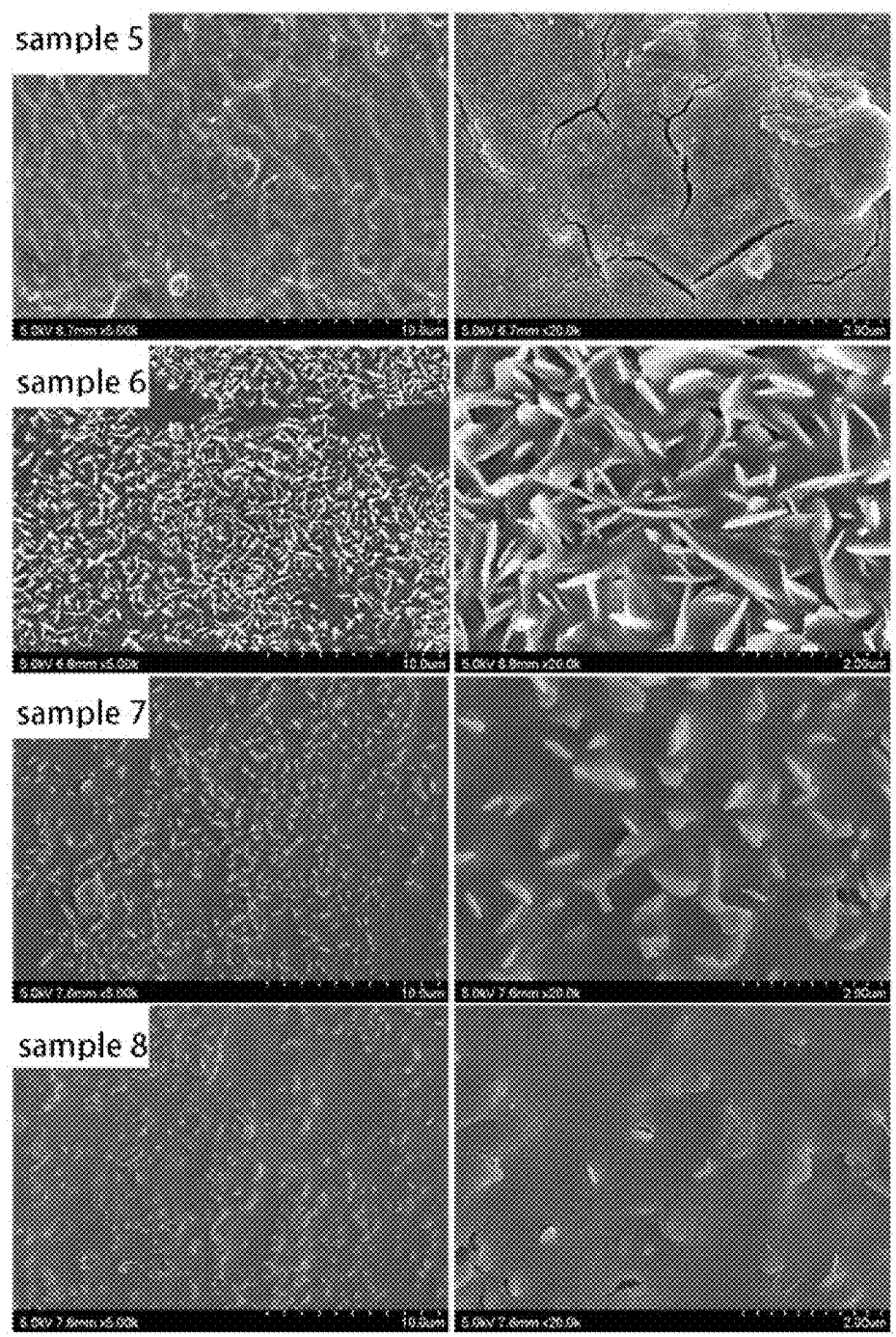
FIG. 3 shows SEM images of FeCr alloy surfaces coated with Ru, which are prepared by an impregnation method or a precipitation method under various conditions. Sample 5 is one Ru-supported by the impregnation method and Samples 6 to 8 are those prepared from Ru precursor solutions having various concentrations.

As shown in FIG. 3, Sample 5 prepared by the impregnation method has many cracks on the surface thereof despite that it was merely dried at 90° C. This indicates that the active metal Ru is not stably coated (deposited) or supported. In this case, the Ru layer may be easily peeled off during the calcination or reaction so as not to exhibit stable catalytic activity. It was also confirmed that the alumina layer on the FeCr alloy surface is filled as the concentration of ruthenium precursor solution increases in Samples 6 to 8.

Example 2: Analysis of Ruthenium Coating Layer Depending on the Aging Condition

Among the aging conditions, the time of the first aging and the temperature of the secondary aging were changed, and then the amount of Ru coated and the thickness of coating layer were measured, respectively.

In Samples 9 and 10, the precursor-containing precipitation reaction solutions of pH 7 were first aged at room temperature (25° C.) with stirring for 6 h and 12 h, respectively, whereas the secondary aging time was fixed to 48 h at 100° C.

In Samples 11 and 12, the precursor-containing precipitation reaction solutions of pH 7 were first aged at room temperature (25° C.) with stirring for a fixed time of 24 h, whereas the secondary aging was performed at 80° C. and 90° C., respectively, for 48 h.

Figure 4:
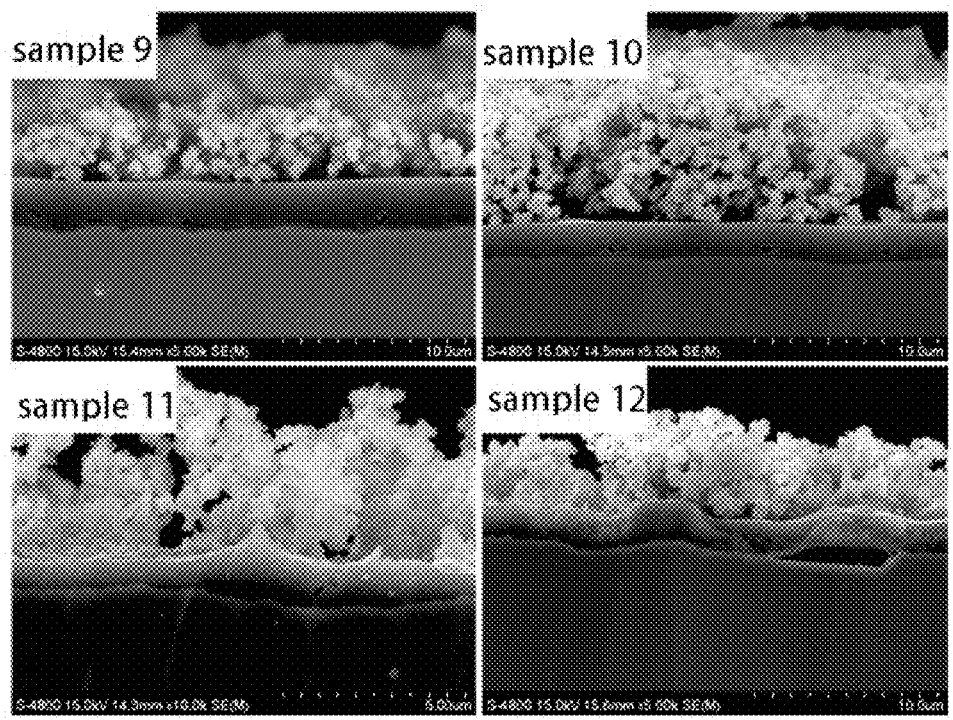
FIG. 4 shows SEM images of FeCr alloy cross sections coated with Ru, which are prepared under various aging conditions.

The FeCr alloy foils coated with Ru, prepared by changing the stirring time and temperature, were ion-milled and cross sections thereof were analyzed, and SEM images are shown in FIG. 4.

From FIG. 4, it was confirmed that the thickness of the Ru coating layer increases as the stirring time and temperature increase. Furthermore, the Ru particle size thus formed further increases.

Experiment: Performance Evaluation of Structured Catalyst

The surface of the substrate of various materials (FeCr alloy, SiC) was coated with Ru highly dispersed according to the two step aging method of the present invention, and the performance of the structured catalyst thus obtained was then evaluated. The structured catalyst was applied to the steam reforming reaction of natural gas as a typical hydrogen producing reaction (Experiments 1 and 2) and to the preferential oxidation of CO for removing CO from synthetic gas (Experiment 3).

Experiment 1: Performance Evaluation of Ru/$Al_2O_3$ Pellet Catalyst Vs. Ru/$Al_2O_3$ Coated FeCr Alloy Monolith Catalyst A Ru coating layer was formed on the surface of FeCr alloy monolith on which an alumina carrier was formed in advance according to the same procedure as Sample 2 of Example 1, except that the substrate had a monolith form, not a foil form.

Catalyst performance evaluation on the steam reforming reaction of natural gas was carried out against the above-obtained FeCr alloy monolith catalyst on which the Ru coating layer was formed (Ru/$Al_2O_3$ coated FeCr alloy monolith catalyst) under the following experimental conditions. Prior to the catalyst performance evaluation, the catalyst was reduced under a hydrogen atmosphere at 700° C. for 3 h.

For comparison, the Ru/$Al_2O_3$ pellet catalyst was also reduced under the same conditions and subjected to the catalyst performance evaluation under the following experimental conditions. Here, the Ru/$Al_2O_3$ pellet catalyst was obtained from Clariant Co. (Switzerland).

The Ru metal loading in the pellet catalyst and the monolith catalyst was 0.14 g and 0.038 g, respectively.

Figure 5:
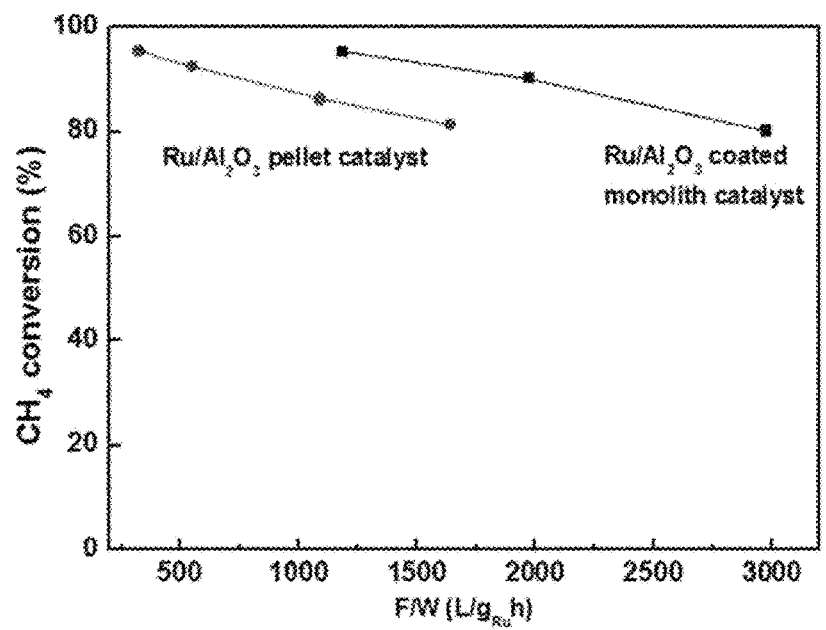
FIG. 5 shows the performance evaluation results of Ru/$Al_2O_3$ pellet catalyst vs. Ru/$Al_2O_3$ coated FeCr alloy monolith catalyst.

Experimental condition: Steam/Carbon (S/C)=3.0, Temperature=700° C., Normal Pressure The results are shown in FIG. 5 below. From FIG. 5, it was confirmed that the FeCr alloy monolith catalyst shows very excellent catalytic activity, i.e., high $CH_4$ conversion, in the steam reforming reaction of natural gas even though a smaller amount of Ru metal is loaded therein than in the pellet catalyst.

This result suggests that when the structured catalyst of the present invention having a small amount of Ru metal coated in a highly dispersed manner is used instead of the conventional pellet catalyst in the hydrogen producing reactor and system, reduced reactor size and cost savings can be achieved.

Experiment 2: Performance Evaluation of $Ru/Al_2O_3$ Pellet Catalyst Vs. $Ru/Al_2O_3$ Coated SiC Monolith Catalyst A Ru coating layer was formed on the surface of SiC monolith on which an alumina carrier was formed in advance according to the same procedure as Sample 2 of Example 1, except that a monolith of non-oxide SiC ceramics was used as a substrate.

Catalyst performance evaluation on the steam reforming reaction of natural gas was carried out against the above-obtained SiC monolith catalyst on which the Ru coating layer was formed ($Ru/Al_2O_3$ coated SiC monolith catalyst) under the following experimental conditions. Prior to the catalyst performance evaluation, the catalyst was reduced under a hydrogen atmosphere at 700° C. for 3 h.

For comparison, the $Ru/Al_2O_3$ pellet catalyst was also reduced under the same conditions and subjected to the catalyst performance evaluation under the following experimental conditions. Here, the $Ru/Al_2O_3$ pellet catalyst was obtained from Clariant Co. (Switzerland).

The Ru metal loading in the pellet catalyst and the monolith catalyst was 0.14 g and 0.083 g, respectively.

Experimental condition: Steam/Carbon (S/C)=3.0, F/W=314-530 $L/g_{Ru}\cdot h$, Temperature=550° C. to 700° C., Normal Pressure (GHSV was converted to F/W by applying the catalyst weight)

Figure 6:
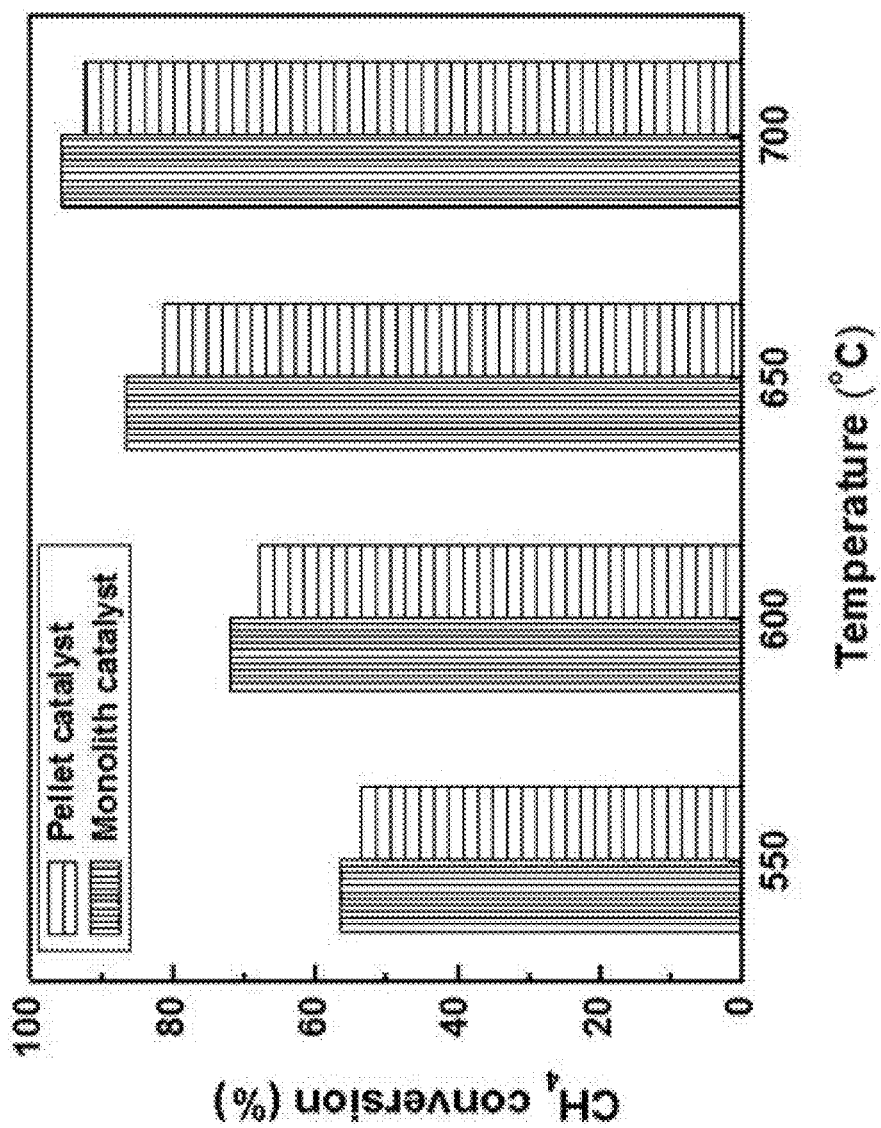
FIG. 6 shows the performance evaluation results of Ru/$Al_2O_3$ pellet catalyst vs. Ru/$Al_2O_3$ coated SiC monolith catalyst.

The results are shown in FIG. 6 below. From FIG. 6, it was confirmed that the SiC monolith catalyst shows very excellent catalytic activity, i.e., high $CH_4$ conversion, in the steam reforming reaction of natural gas even though a smaller amount of Ru metal is loaded therein than in the pellet catalyst.

In addition, the result of FIG. 6 suggests that a small amount of Ru (active metal) can be supported on the surface of the substrate in a highly dispersed manner regardless of the kind of monolith, and the catalyst of the present invention shows better catalytic activity than the conventional pellet catalyst.

Experiment 3: Performance Evaluation of $Ru/Al_2O_3$ Pellet Catalyst Vs. $Ru/Al_2O_3$ Coated FeCr Alloy Monolith Catalyst A small amount of Ru was coated on FeCr alloy monolith, and performance thereof was evaluated in the preferential oxidation of CO.

A Ru coating layer was formed on the surface of FeCr alloy monolith on which an alumina carrier was formed in advance according to the same procedure as Sample 2 of Example 1, except that 57 mM of the Ru precursor solution was used.

Catalyst performance evaluation on the preferential oxidation of CO was carried out against the above-obtained FeCr alloy monolith catalyst on which the Ru coating layer was formed ($Ru/Al_2O_3$ coated FeCr alloy monolith catalyst) under the following experimental conditions. Prior to the catalyst performance evaluation, the catalyst was reduced under a hydrogen atmosphere at 200° C. for 2 h.

For comparison, the $Ru/Al_2O_3$ pellet catalyst was also reduced under the same conditions and subjected to the catalyst performance evaluation under the following experimental conditions. Here, the $Ru/Al_2O_3$ pellet catalyst was obtained from Tanaka Precious Metals International Inc. (Japan).

The Ru metal loading in the pellet catalyst and the monolith catalyst was the same, 0.014 g.

Figure 7:
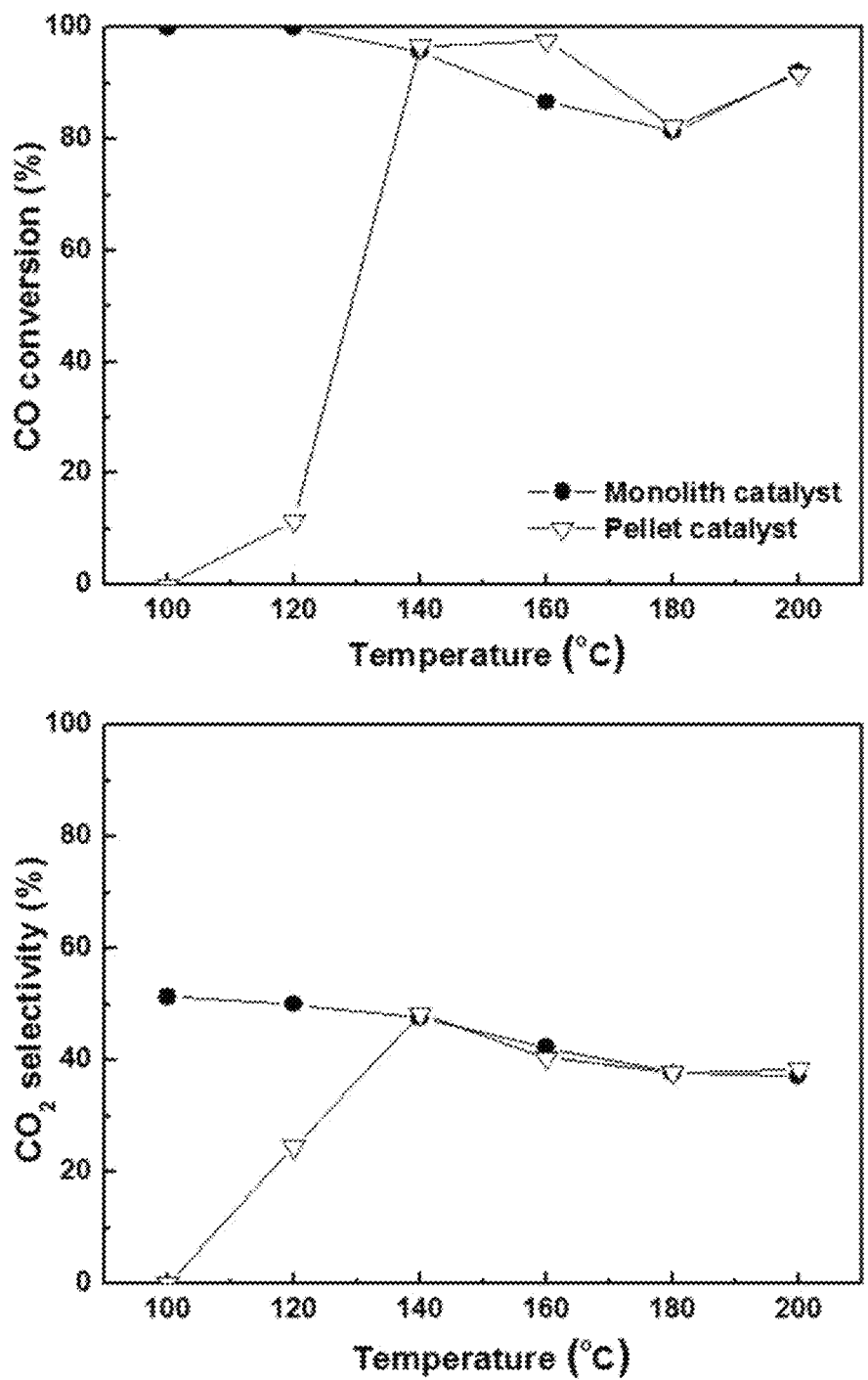
FIG. 7 shows the performance evaluation results of Ru/$Al_2O_3$ pellet catalyst vs. Ru/$Al_2O_3$ coated FeCr alloy monolith catalyst.

Experimental condition: 59% $H_2$, 0.61% CO, 0.61% $O_2$, 16% $CO_2$, 19% $H_2O$, $N_2$ bal., $\lambda$=2, F/W=2,755 $L/g_{Ru}\cdot h$, Normal Pressure The results are shown in FIG. 7 below. From FIG. 7, it was confirmed that the monolith catalyst of the present invention shows remarkably high CO conversion and selectivity for $CO_2$ compared to the pellet catalyst at a low temperature of 140° C. or lower.

The invention claimed is:

1. A method of preparing a catalyst comprising a ruthenium-containing catalyst layer formed on a surface of a substrate having a structure, which comprises:
    adding a precipitating agent to a ruthenium (Ru) precursor-containing solution to obtain a mixed solution (step 1);
    first aging the mixed solution of the step 1 at 10° C. to 40° C. to form ruthenium-containing precipitate seeds (step 2);
    secondarily aging the first aged mixed solution at 80° C. to 100° C. to grow the ruthenium-containing precipitate seeds, thereby forming ruthenium-containing precipitate particles (step 3);
    contacting the secondarily aged mixed solution with the substrate to coat the surface of the substrate with the ruthenium-containing precipitate particles, thereby inducing the formation of a ruthenium-containing layer (step 4); and
    conducting a heat treatment of the ruthenium-containing layer (step 5).

2. The method of claim 1, wherein the step 2 and the step 3 are performed in order.

3. The method of claim 1, wherein the ruthenium (Ru) precursor-containing solution further comprises a precursor of platinum (Pt), palladium (Pd), rhodium (Rh), iridium (Tr), osmium (Os) or a mixed metal thereof.

4. The method of claim 1, wherein the precipitating agent is ammonia, KOH, NaOH, urea, $Na_2CO_3$, $K_2CO_3$ or a mixture thereof.

5. The method of claim 1, wherein the mixed solution in the step 1 has a pH of 6 to 11.

6. The method of claim 1, wherein the first aging is performed with stirring.

7. The method of claim 1, wherein the first aging is performed for 3 h to 48 h.

8. The method of claim 1, wherein the secondary aging is performed for 36 h to 100 h.

9. The method of claim 1, wherein the substrate consists of a FeCr alloy, SiC, Al, an Al alloy, Ti, a Ti alloy or stainless steel.

10. The method of claim 1, wherein the substrate has a structure of monolith, foam, felt, mat, mesh, foil or pin.

11. A method of preparing a catalyst comprising a ruthenium-containing catalyst layer formed on a surface of a substrate having a structure, which comprises:
   Adding a precipitating agent to a ruthenium (Ru) precursor-containing solution to obtain a mixed solution (step 1);
   first aging the mixed solution of the step 1 at 10° C. to 40° C. to form ruthenium-containing precipitate seeds (step 2);
   introducing a substrate to the first aged mixed solution (step 3);
   secondarily aging the first aged mixed solution at 80° C. to 100° C. to grow the ruthenium-containing precipitate seeds, thereby forming ruthenium-containing precipitate particles (step 4), whereby the ruthenium-containing precipitate particles are formed and simultaneously coated on the surface of the substrate;
   conducting a heat treatment of the ruthenium-containing layer (step 5).

12. A method of forming a ruthenium-containing layer on a surface of a substrate having a structure, which comprises:
   adding a precipitating agent to a ruthenium (Ru) precursor-containing solution to obtain a mixed solution (step 1);
   first aging the mixed solution of the step 1 at 10° C. to 40° C. to form ruthenium-containing precipitate seeds (step 2);
   secondarily aging the first aged mixed solution at 80° C. to 100° C. to grow the ruthenium-containing precipitate seeds, thereby forming ruthenium-containing precipitate particles (step 3); and
   contacting the secondarily aged mixed solution with the substrate to coat the surface of the substrate with the ruthenium-containing precipitate particles, thereby inducing the formation of a ruthenium-containing layer (step 4).

* * * * *